(12) United States Patent
Stone

(10) Patent No.: US 7,277,640 B2
(45) Date of Patent: Oct. 2, 2007

(54) OPTICAL ADD/DROP MULTIPLEXING SYSTEMS

(75) Inventor: Thomas W. Stone, Hellertown, PA (US)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 598 days.

(21) Appl. No.: 10/717,387

(22) Filed: Nov. 18, 2003

(65) Prior Publication Data

US 2005/0105909 A1 May 19, 2005

(51) Int. Cl.
*H04J 14/02* (2006.01)
(52) U.S. Cl. ............................ 398/84; 398/79; 398/83; 398/87; 359/566; 359/573; 359/569; 359/15; 385/37
(58) Field of Classification Search ................. 398/84, 398/87, 79; 385/37; 359/566, 569, 571, 359/573
See application file for complete search history.

(56) References Cited

U.S. PATENT DOCUMENTS

| | | | | |
|---|---|---|---|---|
| 3,549,239 A | * | 12/1970 | Brienza et al. ............. | 359/566 |
| 4,786,124 A | * | 11/1988 | Stone et al. ................ | 359/15 |
| 4,834,474 A | * | 5/1989 | George et al. ............... | 359/8 |
| 5,692,077 A | | 11/1997 | Stone et al. | |
| 5,771,320 A | | 6/1998 | Stone | |
| 6,072,923 A | | 6/2000 | Stone | |
| 6,178,041 B1 | * | 1/2001 | Simon ........................ | 359/368 |
| 6,665,460 B2 | * | 12/2003 | Derventzis et al. ........... | 385/16 |
| 6,673,497 B2 | * | 1/2004 | Efimov et al. ................. | 430/1 |
| 6,735,362 B1 | * | 5/2004 | Soskind ....................... | 385/37 |
| 6,801,310 B2 | * | 10/2004 | Kewitsch et al. ........... | 356/328 |
| 6,909,822 B2 | * | 6/2005 | Barton et al. .................. | 385/24 |
| 6,941,073 B2 | * | 9/2005 | McGuire ..................... | 398/84 |
| 6,956,987 B2 | * | 10/2005 | Doerr .......................... | 385/17 |
| 6,996,343 B2 | * | 2/2006 | Neilson ....................... | 398/84 |
| 7,018,563 B1 | * | 3/2006 | Sutherland et al. .... | 252/299.01 |
| 7,031,573 B2 | * | 4/2006 | Volodin et al. ............... | 385/37 |
| 7,106,966 B1 | * | 9/2006 | Lalonde et al. ............... | 398/46 |
| 2002/0044725 A1 | * | 4/2002 | Tedesco et al. ............... | 385/24 |
| 2002/0131683 A1 | * | 9/2002 | Doerr .......................... | 385/19 |
| 2002/0154855 A1 | * | 10/2002 | Rose et al. .................... | 385/24 |
| 2002/0167695 A1 | * | 11/2002 | Senturia ...................... | 359/130 |
| 2003/0063385 A1 | * | 4/2003 | Takushima et al. ......... | 359/566 |
| 2004/0076368 A1 | * | 4/2004 | Takushima et al. ........... | 385/18 |
| 2005/0036202 A1 | * | 2/2005 | Cohen et al. ................ | 359/495 |

OTHER PUBLICATIONS

U.S. Appl. No. 10/700,828 filed Nov. 4, 2003. Applicant: Thomas W. Stone. Title: Wavelength Selective Switching and/or Routing System.

* cited by examiner

*Primary Examiner*—Kenneth Vanderpuye
*Assistant Examiner*—Thi Q. Le

(57) ABSTRACT

The present invention overcomes problems associated with switch isolation, noise and crosstalk suppression, insertion loss, spurious reflections, wavelength tolerance, and compactness that are present in varying degrees in other add/drop systems. The present invention includes devices or components that include, but are not limited to high efficiency switchable gratings.

15 Claims, 8 Drawing Sheets

OPTICAL ADD/DROP MULTIPLEXING SYSTEMS

BACKGROUND OF THE INVENTION

The present invention relates generally to wavelength division multiplexing and demultiplexing systems, and, more particularly, to optical add/drop multiplexing and related switching systems utilizing switched gratings.

With the advent of substantial new uses for electro/optic systems, there exists a greater need to effectively control the multiplexing and routing of signals that are Wavelength Division Multiplexed (WDM), and Dense Wavelength Division Multiplexed (DWDM), on optical fibers. A central operation required in managing such WDM and DWDM systems is the addition of signals into empty channels (Add) and selection of signals from populated channels (Drop). Each of these channels correspond to specific, predefined wavelength ranges in the wavelength division multiplexed signal stream. A typical signal in a given channel consists of a modulated optical carrier that has a center (carrier) frequency corresponding to a wavelength in that predefined wavelength range. The International Telecommunications Union (ITU) has defined grids of WDM channels each with a center frequency, frequency spacing between channels, etc.

For example, when a stream of n discrete wavelength channels are multiplexed on a single optical fiber, there is a need to selectively remove the signals from specific wavelength channels and to selectively add signals into specific wavelength channels to the data stream. The initial multiplexing of many different wavelength channels requires wavelength multiplexers. Similarly, wavelength demultiplexers (also, referred to, in the context of this application, as "drop" multiplexers) are often required to separate the different wavelength channels which are multiplexed in WDM systems. Such devices are needed, for example, in digital telecommunication systems and analog RF photonic systems, although, it should be realized that these are just two of numerous electro-optic systems which require the use of such devices.

Past approaches for optically multiplexing, demultiplexing, adding, or dropping optical signals of differing wavelengths have deficiencies associated therewith. These deficiencies include, but are not limited to, excessive insertion loss, expense and complexity, size, lifetime issues, and crosstalk. There is still much room for advancement in these prior approaches, particularly with respect to losses, complexity, crosstalk, switch isolation, compactness and multiple reflection suppression.

It is therefore an object of this invention to provide optical add/drop multiplexing systems which has superior switch isolation, multiple reflection and crosstalk suppression; less complexity and lower insertion loss; and less stringent wavelength tolerances than systems of the past.

It is another object of this invention to provide optical add/drop multiplexing systems which are extremely compact.

It is still another object of this invention to provide optical add/drop multiplexing systems which utilize switchable gratings therein.

SUMMARY OF THE INVENTION

The objects set forth above as well as further and other objects and advantages of the present invention are achieved by the embodiments of the invention described hereinbelow.

The present invention overcomes problems associated with switch isolation, noise and crosstalk suppression, insertion loss, spurious reflections, wavelength tolerance, and compactness that are present in varying degrees in other add/drop systems. The present invention includes devices or components that include, but are not limited to high efficiency switchable gratings.

For example, in one embodiment of the invention, each of the "base" gratings have substantially identical spatial frequencies and each of the "vertex" gratings have substantially identical spatial frequencies. However, the "vertex" gratings have higher grating frequencies than the "base" gratings. In another embodiment of the invention, the "base" and "vertex" gratings have substantially the same grating frequencies. Further embodiments of the invention, for example, deal with multiple add/drop grating pairs, variations of fixed and switchable gratings, the use of grating pairs to spatially separate the wavelength division multiplexed components of input beams into individual beams, and the replacement of lenses and waveguides with detectors or emitters.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

Figure 1:
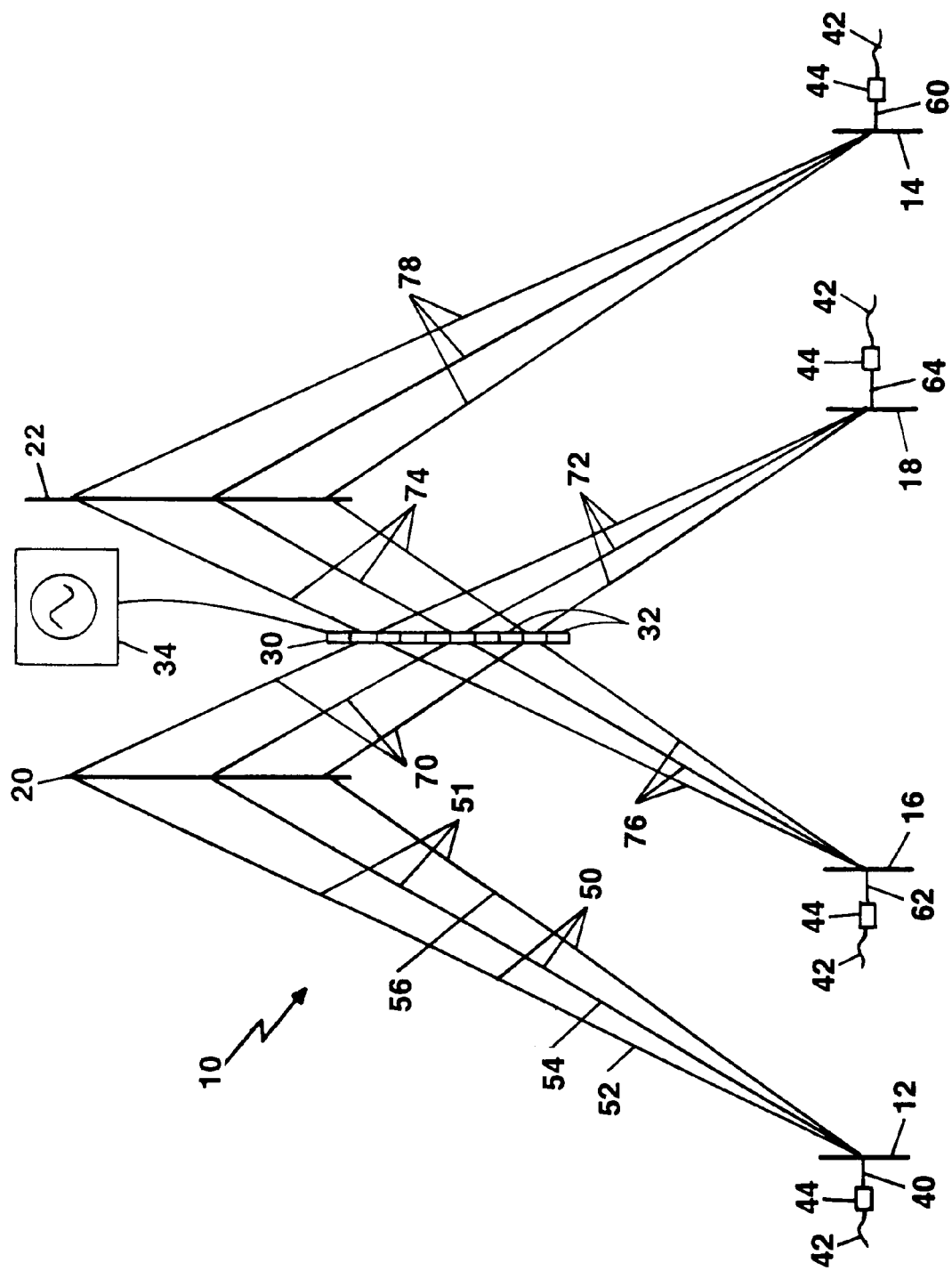
FIG. 1 is a schematic representation illustrating the overall concept of the add/drop multiplexing system of the present invention.

In order to better understand the present invention described below, it should be noted that certain terms used in the description of the invention have interchangeable usage. For example, the term "optical" refers not only to optical components, but also to electro-optical components, while "multiplexer" refers to other forms of switching such as demultiplexing.

Furthermore, terms such as "beams" and "ports" may also be interchanged, in certain instances, based upon their upon their usage as recognized in the art.

In addition, identical components may be referred to with identical reference numerals within the specification and drawings for simplifying an understanding of the various components of this invention.

The present invention provides an optical multiplexing, demultiplexing, and add/drop multiplexing/demultiplexing system or device hereinafter generally referred to as an optical add/drop mutiplexing system that is suitable for adding, dropping, or modifying signals that are wavelength multiplexed onto a common optical path. The present device or system, for example, is suitable for Wavelength Division Multiplexing (WDM) and Dense Wavelength Division Multiplexing (DWDM) applications. The incorporation within this invention of free space switching further adds several distinct advantages over past techniques. More specifically, these advantages include the potential for lower insertion loss, superior switch isolation, multiple reflection and crosstalk suppression, and less complexity.

Reference is now made to FIG. 1 of the drawings which illustrates the broad concept of the invention in schematic fashion, thereby presenting an overview of the optical add/drop multiplexing system 10 of the present invention in one of numerous embodiments, the other embodiments being set forth below with respect to the remaining figures.

The embodiment of the optical add/drop multiplexing system 10 of this invention as illustrated in FIG. 1 of the drawings includes, but is not limited to, static (non-switchable) diffraction gratings 12, 14, 16, 18, 20, and 22 and switchable grating 30. In the configuration of FIG. 1, each of these gratings is parallel to another, and gratings 12, 14, 16, and 18 (also referred to as base gratings) have substantially identical spatial grating frequencies. Similarly, the grating spatial frequencies of gratings 20, 22, and 30 (also referred to as vertex gratings) are also substantially identical, but the vertex gratings have higher grating spatial frequencies than the base gratings, such that the light diffracted by the base gratings is symmetrically diffracted from the vertex gratings and recombined at the subsequent base gratings. For example, in system 10 of FIG. 1, the vertex gratings 20, 22, and 30 can have, for example, twice (not to be construed as a limitation to this invention) the spatial frequency of the base gratings 12, 14, 16, and 18. Base gratings 12 and 18 are located symmetrically with respect to vertex grating 20. Similarly base gratings 16 and 14 are located symmetrically with respect to vertex grating 22. The switchable grating 30 is located at the intersection of the two base-vertex arrangements described above as illustrated in FIG. 1.

The switchable grating 30 is further divided into individually switchable segments or pixels 32. These individually switchable segments can be formed, for example, by pixellating the electrode controlling the grating. Conventional electronic control 34 provides the individual control signals, which switch the individual grating segments "on" or "off".

Operation of the add/drop multiplexer system 10 of FIG. 1 is clearly described below. Input beam 40, preferably in free space, is typically a collimated or nearly collimated beam of electromagnetic radiation (optical signal) that may include a multiplicity of optical signals each of which are modulated on wavelength-multiplexed optical carriers 50 that each have differing center wavelengths. Beams guided in waveguides or optical fibers 42 may be converted into or from free space beams through the use of lenses 44. The lenses 44 may be refractive, diffractive, or gradient index, or a combination thereof. Input beam 40 is incident normally on grating 12 (perpendicularly with respect to the surface of the grating 12) at a single spatial location. Base diffraction grating 12 angularly disperses the input beam 40 into separate wavelength channels or beams 51 each of which may contain distinct modulated optical carriers 50, which may hereinafter be referred to interchangeably as beams, optical carriers or optical carrier beams.

In general, the optical carriers with longer wavelengths are diffracted by grating 12 through larger angles, such that the longest wavelength optical carrier 52 is incident on grating 20 at a higher location than mid-wavelength optical carrier 54, which is in turn incident on grating 20 at a higher location than shortest wavelength optical carrier 56. In such fashion each of the optical carriers 50 or optical carrier beams are incident at distinct spatial locations on vertex gratings 20, 22 and 30 in a manner described in greater detail below.

Similarly beam 62 is input to base grating 16 which angularly disperses input beam 62 into separate channels or beams 76. These beams 76 are dispersed from input beam 62 analogously to the beams 51 dispersed from input beam 40 as described above.

Switchable grating 30 is located symmetrically in the region where the optical carrier beams 70, 72, 76, and 74 intersect as shown in FIG. 1. Further, the size scale of the optical add/drop multiplexing system 10 and width of beams 40, 60, 62, and 64 are chosen such that the individual optical carriers of differing center wavelengths are spatially separated on gratings 20, 22, and 30. The present invention provides a system for a switchable grating segment or pixel 32 along each of optical carrier beams 70 (or subsets thereof) such that for each of optical carrier beams 70, if the intersecting segment of grating 30 is switched "off", the beam is transmitted through grating 30 becoming a respective optical carrier beam 72. If the segment or pixel 32 is switched "on" the beam associated therewith is diffracted and becomes respective optical carrier beam 74. Each of the optical carrier beams or channels can contain modulated optical carriers with different center wavelengths For typical WDM telecom applications, there may be locations for 2, 4, 8, 20, 40, 80, 160, or even more optical carrier beams on an ITU wavelength grid in a given spectral band or carrier group. Thus the number of optical carriers varies considerably from application to application.

For illustrative purposes, but not for limitation, consider the case of all segments or pixels 32 of the switched grating 30 being in the "off" state. In such a case all light incident on grating 30 is transmitted, as if grating 30 did not exist. Initially, all optical carriers 50 are spatially overlapping on a single spot and are normally incident on base grating 12 from beam 40. Because of the symmetric location of vertex grating 20 with respect to base gratings 12 and 18 and the grating frequency relationship described earlier, all optical carriers 50 are angularly diverging toward vertex grating 20 and are spatially separated on vertex grating 20 where they are diffracted symmetrically into optical carrier beams 70 which are converging toward a single spot or location on base grating 18. As these optical carrier beams 70 are transmitted through "off" grating 30, they are transmitted into optical carrier beams 72. When these optical carrier beams 72 are incident on grating 18, they are all diffracted symmetrically back into a single beam 64 in which all differing wavelength optical carriers propagate in a single beam with identical propagation directions. This beam 64 may then readily be coupled into an optical fiber or waveguide 42 using lens 44. Thus, with all switched grating pixels 32 switched off, all the wavelength multiplexed signals in input beam 40 are spatially separated and then recombined in a wavelength multiplexed beam 64.

Still further, consider the case where all segments or pixels 32 of the switched grating 30 are in the "off" state (i.e., are transparent), in which case all light, once again, incident on grating 30 is transmitted, as if grating 30 did not exist. Base gratings 16 and 14 are located symmetrically with respect to vertex grating 22. All optical carriers 76 are initially spatially overlapping on a single spot on base grating 16 and are normally incident on base grating 16 from beam 62. Because of the symmetric location of vertex grating 22 with respect to base gratings 16 and 14 and the grating frequency relationship described earlier, all optical carriers 76 after diffraction by base grating 16 are angularly diverging toward vertex grating 22. As these optical carrier beams 76 are transmitted through "off" grating 30, they become optical carrier beams 74, and are spatially separated on vertex grating 22 where they are diffracted symmetrically into optical carrier beams 78 which converge toward a single spot or location on base grating 14. When these optical carrier beams 78 are incident on grating 14, they are all diffracted symmetrically back into a single beam 60 in which all differing wavelength optical carriers propagate in a singe beam with identical propagation directions. This beam 60 may then readily be coupled into an optical fiber or waveguide 42 using lens 44. Thus, with all switched grating pixels 32 switched "off", all the wavelength multiplexed signals in input beam 62 are spatially separated and then recombined in a wavelength multiplexed beam 60.

Due to the symmetric nature of switchable diffraction gratings, a dual mapping occurs simultaneously with optical carrier beams 76 incident on the switched grating 30 with respect to the optical carrier beams 70 incident on the switched grating 30 as described above. Therefore, if all the switchable grating segments 32 are "off", optical carrier beams 70 are transmitted into optical carrier beams 72, and optical carrier beams 76 are transmitted into optical carrier beams 74. In such a case, all the wavelength multiplexed carriers (and the signals they carry) that are input in beam 40 are output in beam 64; and all the wavelength multiplexed carriers (and the signals they carry) that are input in beam 62 are output in beam 60.

Alternately, if all the switchable grating segments or pixels 32 are "on", optical carrier beams 70 are diffracted into optical carrier beams 74, and optical carrier beams 76 are diffracted into optical carrier beams 72. In this latter case, all the wavelength multiplexed carriers (and the signals they carry) that are input in beam 40 are output in beam 60; and all the wavelength multiplexed carriers (and the signals they carry) that are input in beam 62 are output in beam 64.

Since the individual optical carriers (each with a unique center wavelength) are spatially resolved on switched grating 30 and are each incident on a unique switched grating pixel of group of pixels 32, the route of each wavelength multiplexed signal in beams 40 and 62 may be individually controlled by setting the state of the corresponding grating pixel 32 such that it is output in either of beams 64 or 60. Each of the optical carrier beams represent modulated optical carriers with different center wavelengths, and corresponding optical carrier beams 70, 72, 76, and 74 (defined by intersections at a common grating segment of grating 30) represent modulated optical carriers of a common particular center wavelength. Accordingly, for example, for each optical carrier beam 76, if the intersecting segment of grating 30 is switched "off", the beam in optical carrier group 76 is transmitted through grating 30 becoming a optical carrier beam 74 and is ultimately included in output beam 60. If the input beam 40 contains an optical carrier of the same center wavelength as the optical carrier beam 76 described above, it will be transmitted through the same "off" pixel and output in beam 64. If this same segment of switched grating 30 described above is switched "on", the corresponding optical carriers (if present) from inputs 40 and 62 will be diffracted and output in beams 60 and 64, respectively.

Figure 2:
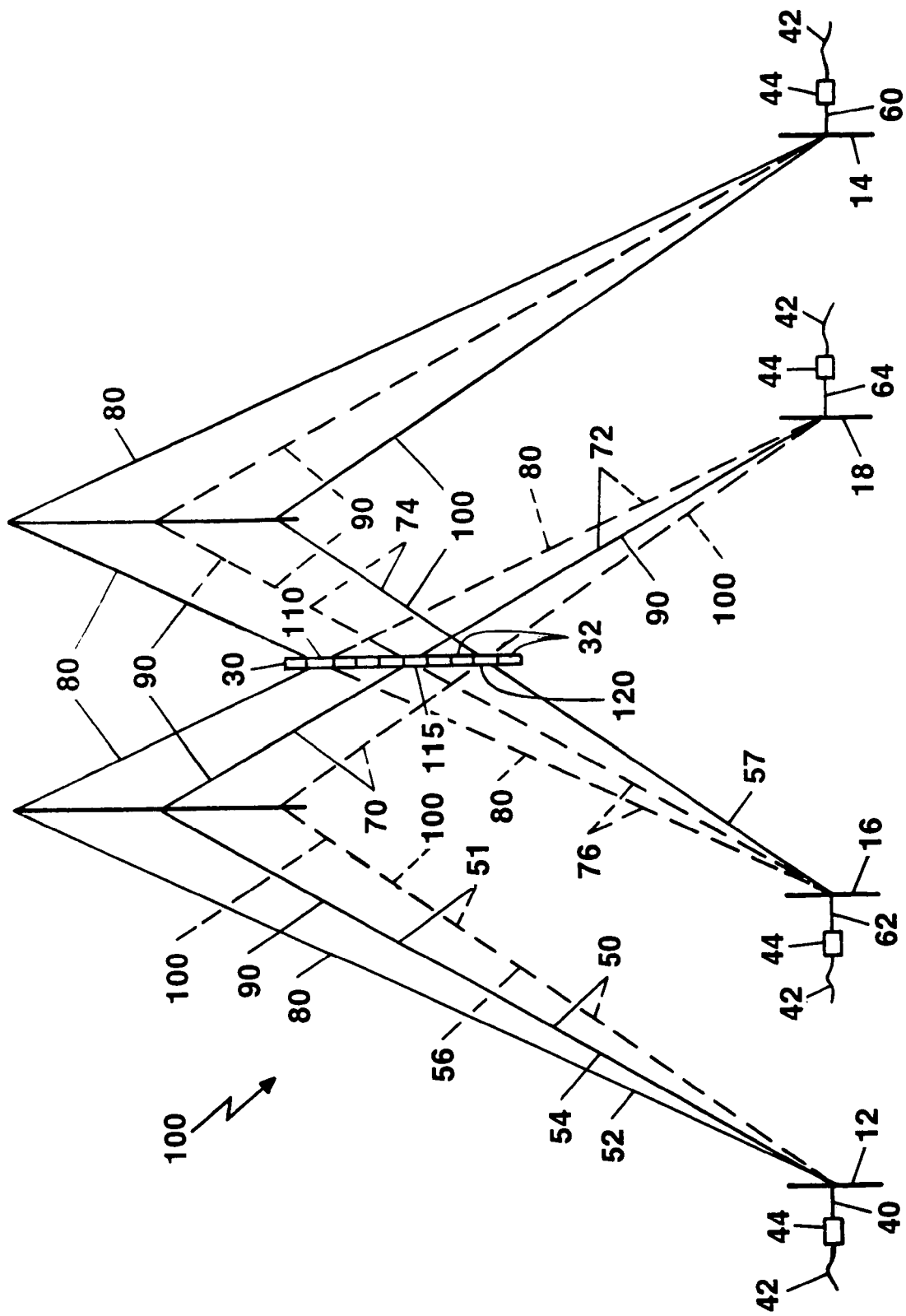
FIG. 2 is a schematic representation illustrating various modes of operation of the add/drop multiplexing system of the present invention.

Reference is now made to FIG. 2 for further operation of the wavelength add/drop multiplexing system 10. For convenience the beams 40, 60, 62, and 64 may also be described as input, output, add, and drop ports, respectively.

Consider the wavelength division multiplexed (WDM) scenario where the input, output, add, and drop ports or beams 40, 60, 62, and 64, respectively, may each may contain many wavelength multiplexed optical carriers propagating as single multiplexed beams which are incident at respective single port locations. Each of these wavelength multiplexed optical carriers may be modulated with one or more signals. It is conventional in the wavelength division multiplexed (WDM) scenario to universally name each of the many possible WDM channels, each of which are defined by a particular center wavelength. These WDM channels have two states: either the WDM channels are "populated" and contain an optical carrier of the center wavelength defined for the WDM channel, or they are "empty" WDM channels which do not contain an optical carrier. The optical carrier in a given WDM channel may be "dropped" or removed, thus leaving the WDM channel empty. Alternatively, an empty WDM channel can have an optical carrier "added" in which case it is then populated.

For the purpose of illustrating the operation of the add/drop multiplexing system 10 shown in FIG. 2, three of the many possible named WDM channels 80, 90, and 100 are illustrated. WDM channel 80 is defined by the wavelength used in the longest wavelength optical carrier 52. WDM channel 90 is defined by the wavelength used in a midwavelength optical carrier 54. WDM channel 100 is defined by the wavelength used in the shortest wavelength optical carrier 56. There may typically be tens or hundreds of named WDM channels incident on optical add/drop multiplexing system 10, such as defined by the ITU grid discussed earlier. Pixellated switched grating 30 contains a separately controllable switched grating pixel at the locations of each of the channels or subsets of channels it is desirable to add or drop among ports 40, 60, 62, and 64. Input beam 40 as shown in FIG. 2 contains carrier 52 in WDM channel 80, carrier 54 in WDM channel 90, and no optical carrier in WDM channel 100 (as represented by the dotted line). In FIG. 2, empty WDM channels are represented by dotted lines, and populated WDM channels are represented by solid lines.

Still referring to FIG. 2, add/drop multiplexing system 10 is represented therein with switched grating pixel 110 of grating 30, corresponding to WDM channel 80, being switched "on" (i.e., diffracting). The switched grating pixel 115 corresponds to WDM channel 90 and is switched "off" (i.e., non-diffracting). Switched grating pixel 120 corresponding to empty WDM channel 100 is also switched "off". With these settings it is shown below that optical carrier 52 is transmitted from input port 40 to output port 60; carrier 54 is dropped from input port 40 to drop port 64; and carrier 57 (along with any information that is modulated upon it) is added from add port 62 to output port 60.

These three cases illustrate the basic functionality of the optical add/drop multiplexing system 10. When the carriers are added or dropped from any ports, all the information that may be modulated upon the carriers is also added or dropped from the ports. For example, if there are eighty defined or named WDM channels, optical carriers and their information in any of the channels may be input into optical add/drop multiplexing system 10 at port (or multiplexed beam) 40; any or all of these carriers can be dropped from output port 60 to drop port 64 by switching off (clearing) the corresponding pixel on grating 30; and any or all of these carriers can be added to output port 60 through add port 62 by switching off the corresponding pixel on gating 30. In typical operation for each named WDM channel, optical carriers may 1) be added to an empty input channel, 2) dropped from a populated input channel, 3) both (i.e., dropped from a populated input channel and a new carrier added to the same channel); and/or 4) neither (in which case any input carrier in the named channel is transmitted from the input port to the output port. In such a fashion, each of the segments or pixels 32 on switched grating 30 are used to control the passage, addition, or dropping of particular modulated optical carriers.

The switchable gratings used in the configurations described above may be fabricated using many technologies. In a preferred embodiment, the switchable gratings may be formed using Polymer Dispersed Liquid Crystal (PDLC) volume holographic gratings which can be fabricated with very low insertion loss (e.g., 0.1-0.3 dB/grating) and fast switching times. In another aspect of the present invention, the same PDLC switchable gratings preferred for use in these devices can be used for the static non-switchable gratings that are also used in these devices. Accordingly, the electrodes used to apply electric fields to switch the switchable gratings may be omitted from the gratings for the non-switchable gratings. In such an instance all the advantages of low insertion loss, high diffraction efficiency, low scatter, etc. of the switchable gratings can be provided for the non-switchable gratings, and the performance of the present invention is further enhanced since the absorption and surface reflection losses induced by the transparent electrodes are eliminated in the non-switchable gratings. This principle is also applicable to other forms of switchable holographic elements including lenses, mirrors, and corrector plates. Other preferred recording materials for the non-switchable diffraction gratings include dichromated gelatin and the DMP-128 photopolymer for volume holographic gratings; and holographically exposed photoresists for producing blazed holographic surface relief diffraction gratings.

Figure 3:
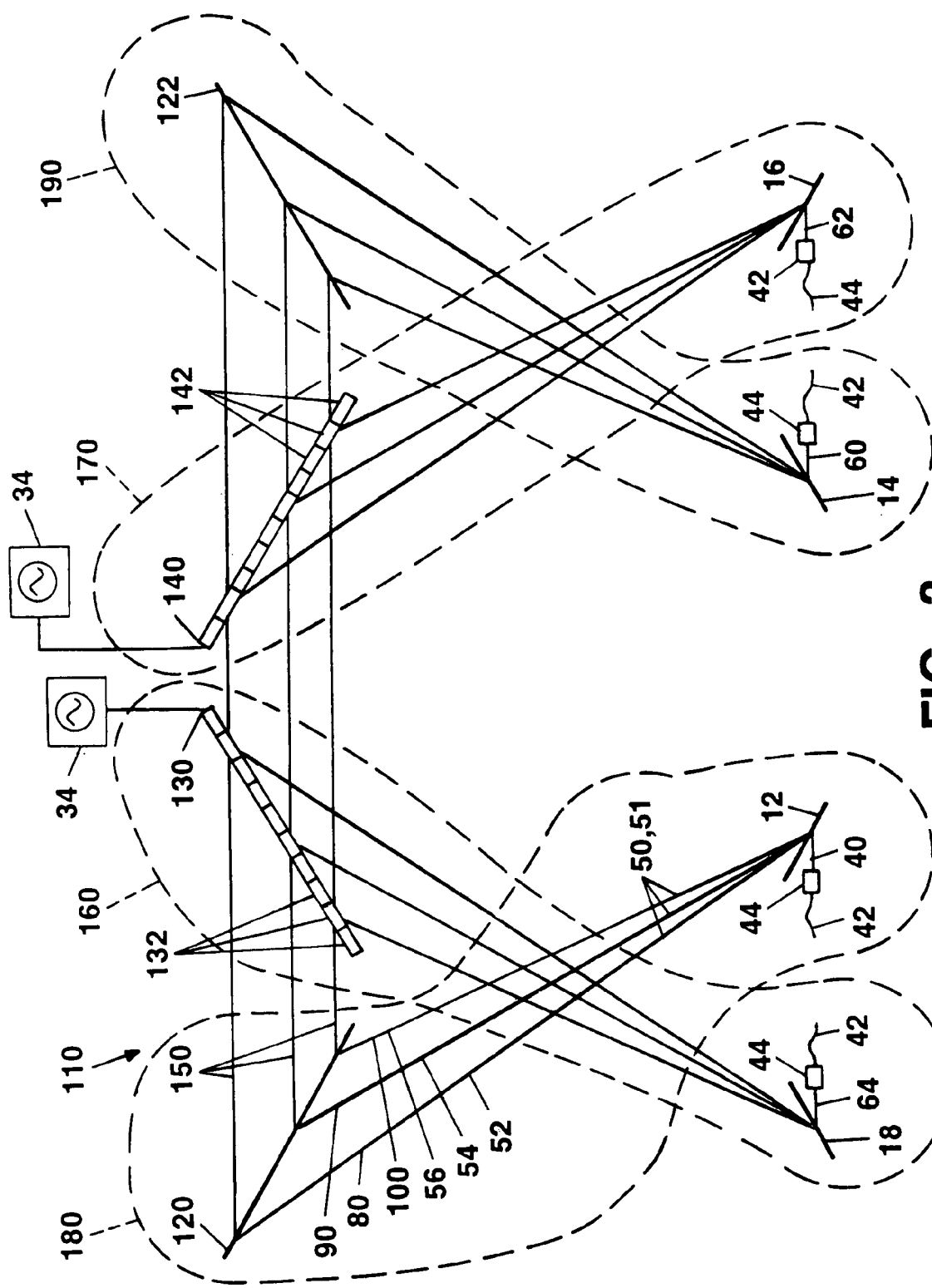
FIG. 3 is a schematic representation illustrating an alternate embodiment of the add/drop multiplexing system of the present invention.

Another embodiment of the optical add/drop multiplexer of this invention is illustrated by optical add/drop multiplexing system 110 shown in FIG. 3. As shown in FIG. 3, base gratings 12 and 16 disperse the input and add beams from beams/ports 40 and 60, respectively, as in the optical add/drop system 10. The entering and exiting beams 40, 60, 62, and 64, respectively, are also referred to as ports of the optical add/drop multiplexing systems. Therefore, the connotation "beam(s)/port(s)" may also be used with respect to the description of this invention for purposes of clarity. As in system 10, wavelength-division-multiplexed (WDM) beams 40 and 62 contain multiple multiplexed beams or optical channels each with differing carrier wavelengths, and are dispersed by gratings 12 and 16 so that these channels angularly and spatially separate. Similarly base gratings 14 and 18 combine converging optical beams or channels of differing wavelengths into single wavelength-multiplexed output and drop beams 60 and 64, respectively, as in system 10.

However, in the optical add/drop multiplexing system 110, the "vertex" gratings 120, 122, 130 and 140 have the same grating frequency as the base gratings 12, 14, 16, and 18. Gratings 120, 122, 130 and 140 are typically longer than the base gratings so to intersect all the dispersed carriers 50, but in other respects can be identical to the base gratings. As a result of the gratings all sharing a common grating frequency, the dispersed carriers 50 exiting base grating 12 are all diffracted by grating 120 into beams 150 that are parallel to each other and to the-input beam 40. Due to the dispersion of the gratings and the separation between gratings 12 and 120, the beams 150 are spatially separated. Each of the beams 150 corresponds to a separate WDM channel that may be populated or empty as described earlier.

Gratings 140 and 130 in system 110 are parallel to gratings 120 and 122, respectively, and also share the same grating frequency. However, gratings 130 and 140 are switchable and pixellated into individually controllable grating pixels which may be independently switched "on" or "off". Each grating pixel on switchable gratings 130 and 140 is chosen so that it covers the area of intersection between one (or a subset) of the channels 150 and the respective grating.

The four base gratings 12, 14, 16, and 18 are arranged symmetrically in pairs with upper gratings 120, 122, 140, and 130, respectively, as shown in FIG. 3. Operation of the optical add/drop multiplexer system 110 can now be described. Input beam 40 is dispersed into its separate channels with grating pair 12-120. This grating pair 12-120 forms "input pair" 180. If the pixels of switchable gratings 130 and 140 are all "off" (transparent), then all the channels input in beam 40 are combined (multiplexed) into single output beam 60 by grating pair 14-122. Any channels incident on grating 122 are combined into a single output beam 60 by grating pair 14-122. This grating pair 14-122 forms "output pair" 190. Channels corresponding to any pixels of grating 130 that are switched "on" (diffracting) are multiplexed into drop beam 64 by grating pair 18-130. This grating pair 18-130 forms "drop pair" 160. Finally, any channels populated in add beam 62 may be added to multiplexed output 60 by switching "on" the grating pixels corresponding to those channels on grating 140. These channels are added by the grating pair 16-140. This grating pair 16-140 forms "add pair" 170. In typical operation, a signal would be added to a channel that was either unpopulated at input 40 or was populated at input 40 but whose signal was dropped into drop port 64.

Figure 4:
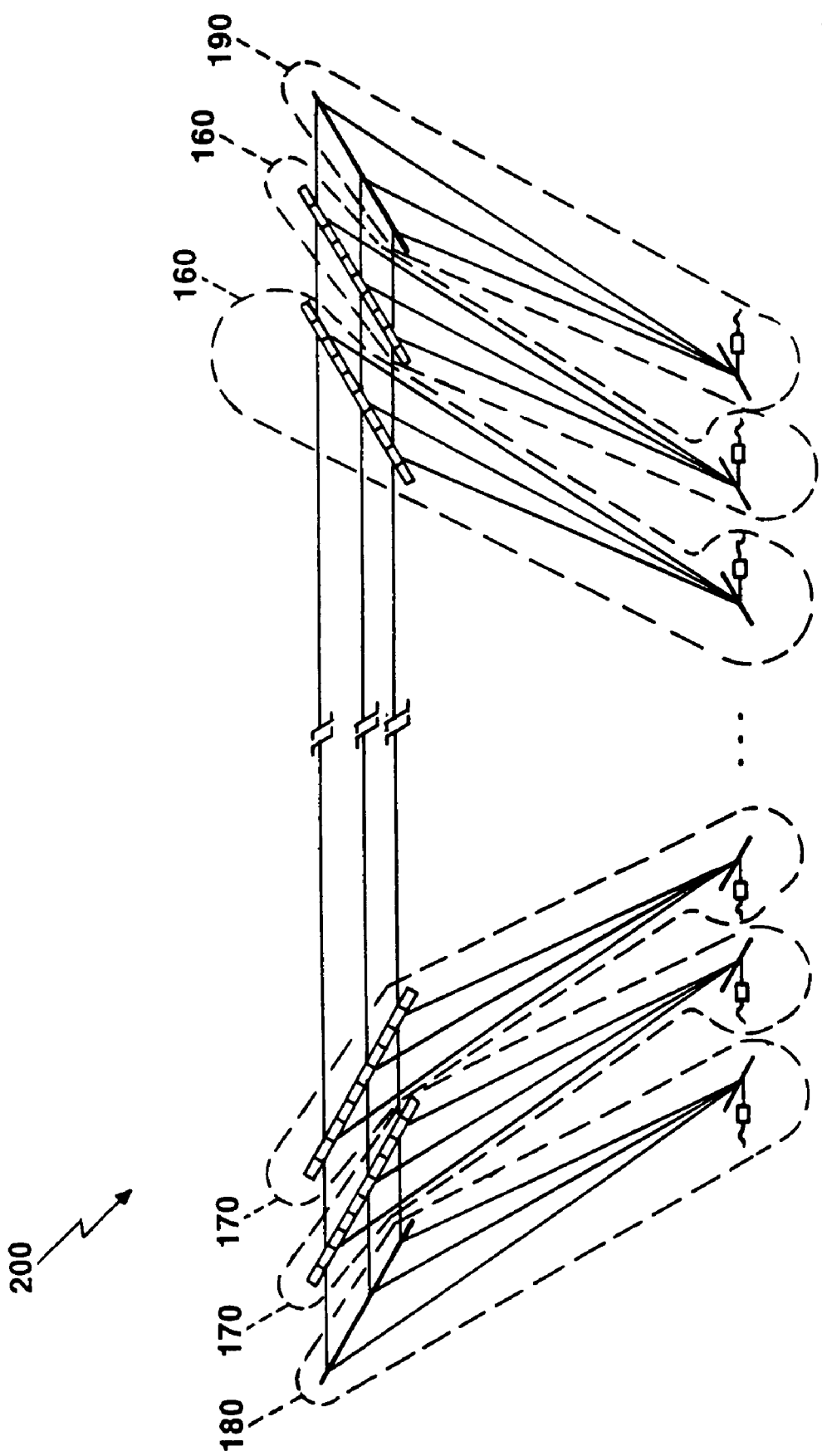
FIG. 4 is a schematic representation illustrating a further embodiment of the add/drop multiplexing system of the present invention.

Another embodiment of the optical add/drop multiplexer of the present invention is system 200 shown in FIG. 4. Here the input pair 180 and output pair 190 of the type described with respect to system 110 are used in conjunction with multiple add pairs 170 and drop pairs 160, all of which are described above. The use of multiple add and drop grating pairs, however, forms more flexible systems which can have zero or multiple add beams (or add ports) and zero or multiple drop beams (or drop ports). The add and drop pairs 160 and 170 can be interspersed in any order. Also system 200 allows for zero, one, or multiple multiplexed signals to be added or dropped from any of the add or drop pairs, respectively. The flexibility of optical add/drop system 200 is evidenced by its ability to add and drop single channels from each of multiple ports instead of adding and dropping all the desired channels from single add and drop ports. This flexibility (of the former case) may be valuable since it obviates the need to later de-multiplex the signals of the latter case.

Figure 5:
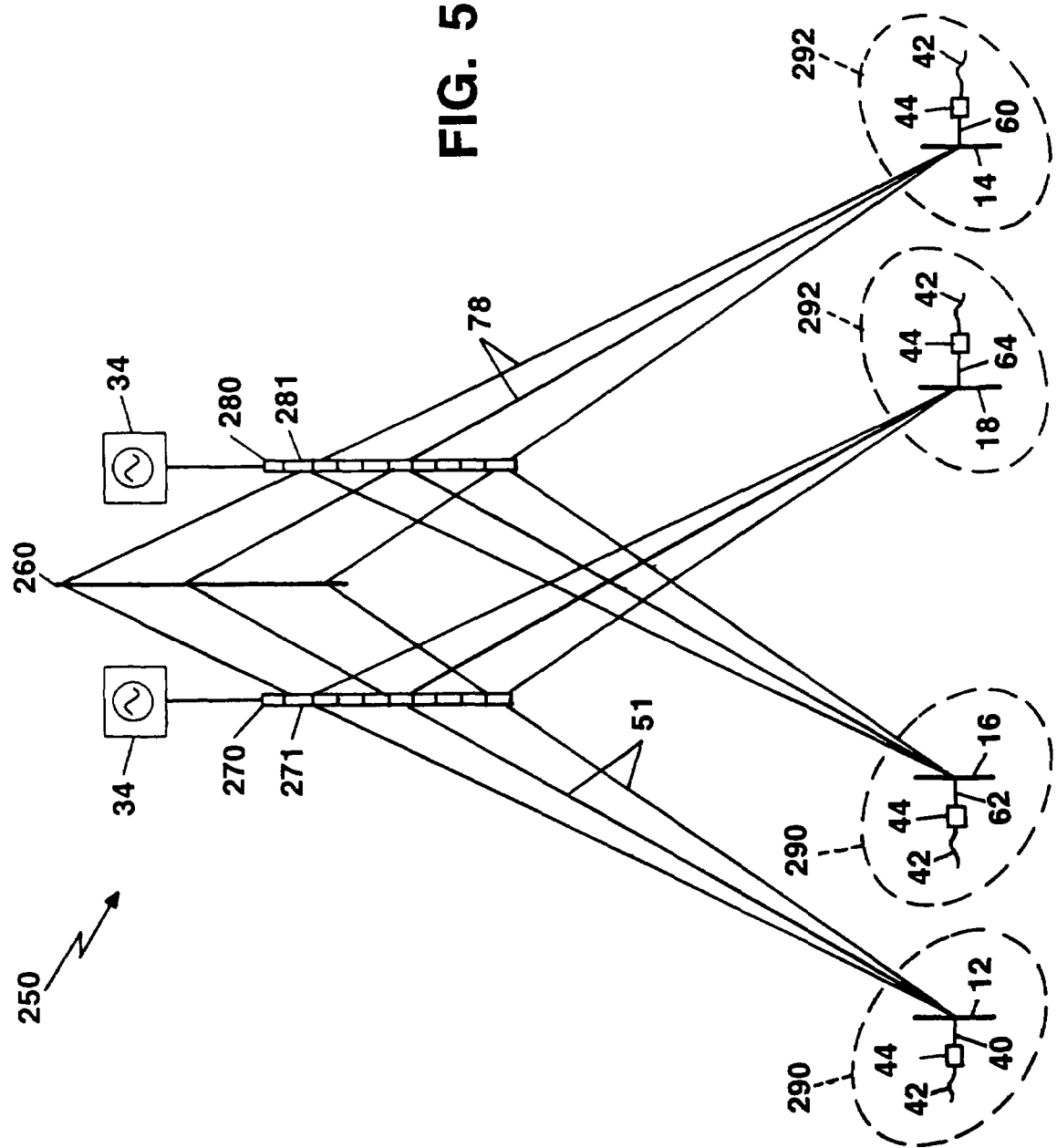
FIG. 5 is a schematic representation illustrating a still further embodiment of the add/drop multiplexing system of the present invention.

Another embodiment of the optical add/drop multiplexer of the present invention is system 250 shown in FIG. 5. System 250 is a variation of system 10, where in system 250, base gratings 12, 14, 16, and 18 function the same as in System 10. There are also three vertex gratings in system 250, however, as shown in FIG. 5, switchable vertex grating 30 (of system 250) is replaced by fixed (non-switchable) vertex grating 260, which is placed at the intersections of beams (channels) 51 and 78. Similarly, fixed vertex gratings 20 and 22 are replaced by similar but pixellated and switchable vertex gratings 270 and 280, respectively.

Operation of the optical add drop multiplexer system 250 can now be understood by referring to FIG. 5. If all the pixels of gratings 270 and 280 are switched off (clear), then the multiplexed signals present in input beam 40 are symmetrically dispersed and recombined into output beam 60. Any of the pixels of grating 270 that are switched on (diffracting) will drop the signals in the corresponding channels into drop beam 64, and in so doing, drop the same signals from output beam 60. Similarly any of the pixels of grating 280 that are switched on (diffracting) will add the signals in the corresponding channels from add beam 62 into output beam 60. Generally signals will be added into channels that are either unpopulated in input beam 40, or into channels that have been dropped into drop beam 64. However, signals can be added into populated channels by switching on the corresponding pixels of grating 280 and introducing the signals in add beam 62. In this case, the added signals will be diffracted by grating 280 into the output beam 60. The signals existing in those same channels at grating 260 will be simultaneously diffracted out of the system by grating 280. These signals diffracted out of the system can be further utilized, as shown in later configurations.

In optical add/drop multiplexing system 250 it is seen that in the operation of dropping a signal and adding a new signal to a single channel, there is twice the crosstalk suppression afforded than that of a single switched grating. In other words, consider the drop/add process for signals in the channel k corresponding to "on" pixels 271 and 281. The diffracting pixel 271 drops the signals incident in input beam 40 on channel k to output beam 64. Lets assume for example (and not for restriction) that switched gratings 270 and 280 operate at a contrast of 30 dB (meaning that when on, the light is diffracted and the spurious beam that is transmitted is attenuated by 30 dB). The "crosstalk" signal that leaks through the diffracting pixel is also diffracted out of the system by pixel 281 which simultaneously "adds" the new signal into that same channel. Thus with grating contrasts of 30 dB, the remnant of the dropped signal in the output is down by 60 dB.

In a similar fashion, additional pixellated switched gratings may be added in a redundant fashion to act as crosstalk suppressors. For example, grating 260 may be substituted with a pixellated switched grating, and can be set clear for pixels that have been dropped at grating 270. This would add an additional measure of suppression of the remnant dropped signal in the output beam 60.

In the prior description of optical add/drop multiplexing systems 10, 110, 200, and 250, examples were given (without restriction intended) of beams 40 and 62 being input and add beams; and beams 60 and 64 being output and drop beams in the context of a 4-port add/drop multiplexer. It should be noted that in fact the operation of the systems is symmetric, and not only can beams 60, 40, 64, and 62 function as input, output, add, and drop beams, respectively, but that these sets of functionality can occur simultaneously in a bi-directional optical add/drop multiplexing functionality.

Figure 6:
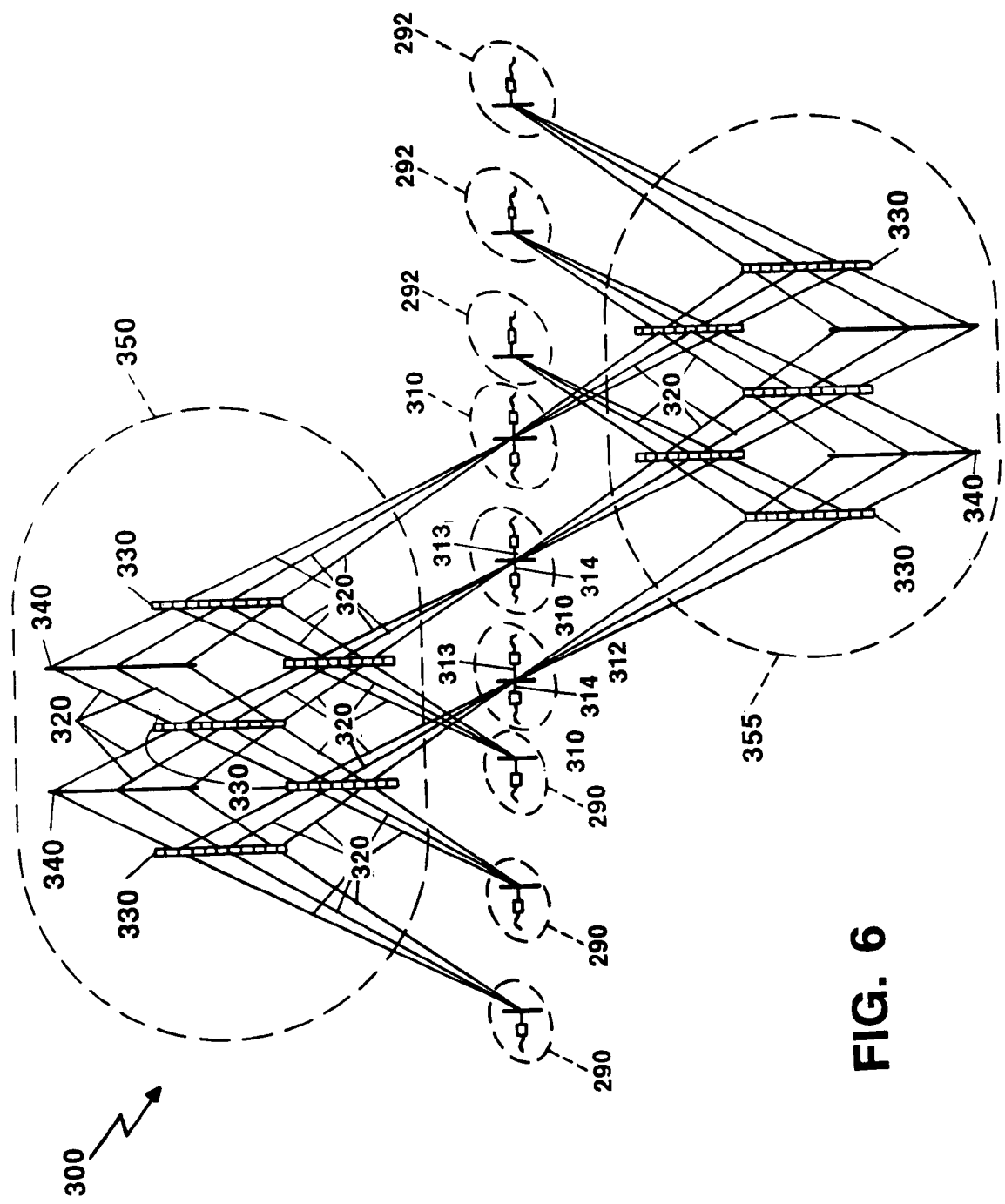
FIG. 6 is a schematic representation illustrating an additional embodiment of the add/drop multiplexing system of the present invention shown in FIG. 5.

Additionally, a pixellated switched grating can be introduced in system 250 at the intersection of the dispersed add and drop beams arising from multiplexed add and drop beams 62 and 64, respectively (see FIG. 6). Use of this additional grating, and the utilization of channels dropped by grating 280 (discussed above), are illustrated in the optical add/drop multiplexing system 300 of FIG. 6. The optical add/drop multiplexing system 300 of FIG. 6 includes of a generalized optical add/drop multiplexing system made up of optical input/output base grating assemblies 290, and optical input/output base grating assemblies 292 as described in the earlier systems. These base gratings are used to form both upward and downward vertex grating cascades 350 and 355, respectively. Each of the vertex grating cascades 350 and 355 consist of switchable pixellated gratings 330 and fixed (non-switchable) vertex gratings 340.

The upper vertex grating branch 350 together with corresponding base gratings illustrates how the optical add/drop multiplexing system 250 can be extended to additional input/output, add, and drop beams or ports. The optical add/drop multiplexing and switching system 300 combines two such extended systems and overlaps functionality of the base gratings in input/output assemblies 310. In assemblies 310, signals may be input and output to the upper branch 350 from the right beam 313, and to the lower branch 355 from the left beam 314. By making the base gratings 312 switchable, coupling between the upper and lower branches is readily obtained by switching off (clearing) grating 312. In so doing, channels in beams 313 and 314 are coupled, and the channels in the corresponding upper and lower branch beams are coupled. A similar functionality with reduced ports can be obtained by simply omitting assemblies 310 altogether. The optical add/drop multiplexing system 300 provides for selective exchange of specific channels among multiple bi-directional ports.

Figure 7:
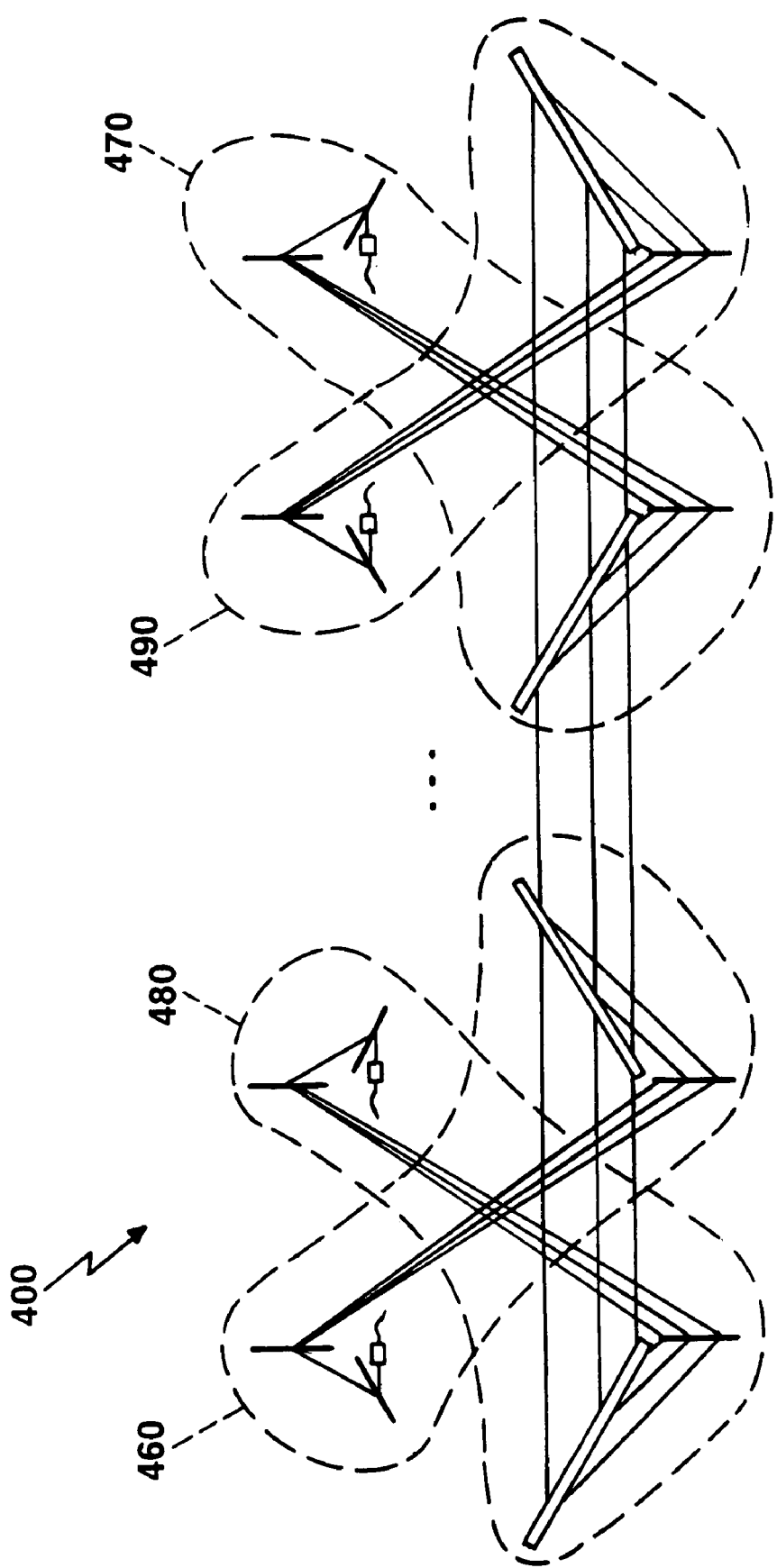
FIG. 7 is a schematic representation illustrating a further embodiment of the add/drop multiplexing system of the present invention using multiple cascading of dispersive gratings.

The optical add/drop multiplexing systems 10, 110, 200, 250, and 300 of the present invention can also take advantage of multiple cascading of dispersive gratings in order to increase dispersion and potentially reduce system size. This type of system variation of the present invention is illustrated in system 400 of FIG. 7. This high dispersion system 400 includes an input cascade 480, and output cascade 490, and drop cascades 460 together with add cascade(s) 470. System 400 is analogous to system 110 in which cascades 460, 470, 480, and 490 replace pairs 160, 170, 180, and 190. In each cascade-for-pair replacement, each of the gratings of the original pair are broken into cascades of two or more gratings. The cascading of gratings in this manner provides for higher angular dispersion of the channels than would be attainable with single gratings. The larger dispersions can shrink the system size for the case of very closely spaced channels, as found in dense wavelength division multiplexed channels. When switched gratings are broken onto two or more cascaded gratings, only one of the cascade, typically the one with most dispersed channels) needs to be switchable. This is illustrated in FIG. 7. Multiple add and drop cascades 470 and 460 can be inserted in the system in any order, as discussed with system 200.

Figure 8:
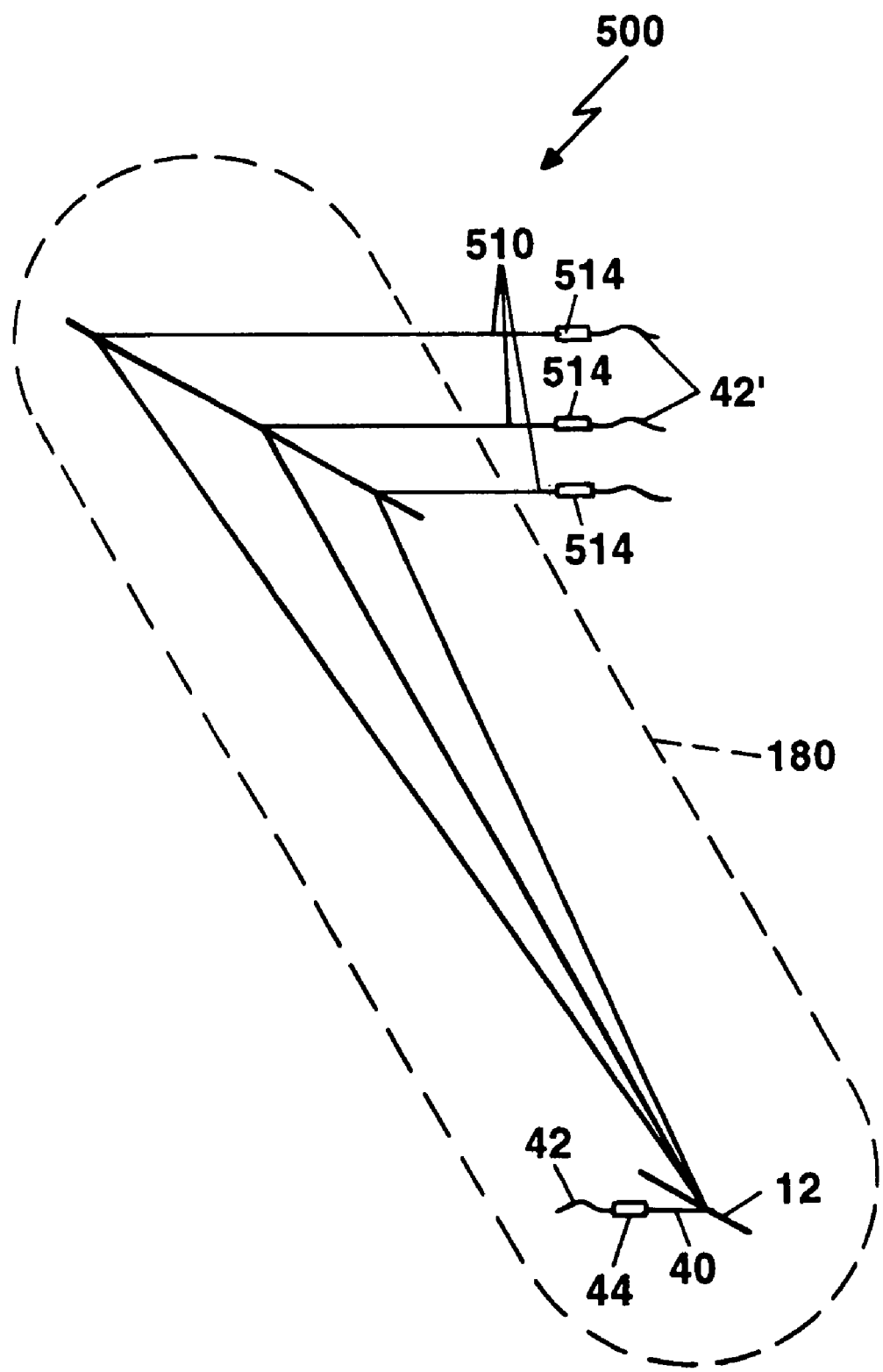
FIG. 8 is a schematic representation illustrating an additional embodiment of the add/drop multiplexing system of the present invention shown in FIG. 4.

Still a further embodiment of the present invention is the optical multiplexing/de-multiplexing system 500 of FIG. 8. In system 500 a grating pair assembly 180, described earlier in FIG. 4, is used to spatially separate the wavelength division multiplexed components of input beam 40 into individual beams 510 propagating parallel to each other as illustrated in FIG. 8. Each of these beams can then be separately coupled into optical fibers or waveguides 42' using lenses 514. Optical multiplexing/de-multiplexing system 500 can be used in either the de-multiplexing mode described above; in the reverse direction as a multiplexer; or both simultaneously in a bi-directional multiplexing/de-multiplexing mode.

It should be noted that the demultiplexed beams 510 will contain some residual lateral dispersion. However, for many applications, this is not a limiting feature of this invention.

Alternatively in system 500 the lenses 514 and waveguides 42' can be replaced by detectors, or by emitters such as lasers. In the latter case, the lasers would each be tuned or selected to emit signals at the wavelength corresponding to the channel in which they are used. Lenses 514 would still be used as required for coupling to the detectors or lasers.

Although the invention has been described with respect to various embodiments, it should be realized this invention is also capable of a wide variety of further and other embodiments within the spirit and scope of the appended claims.

What is claimed is:

1. An optical add/drop multiplexing system, comprising:
   a first optical system, said first optical system including a first series of optical components comprising a first grating, a second grating and a third grating, a first beam/port and a second beam/port, all of said first series of optical components optically aligned with one another; said first grating being capable of separating input optical radiation from said first beam/port into distinct input channels; said second grating being capable of redirecting said distinct input channels;
   a second optical system, said second optical system including a second series of optical components comprising a fourth grating, a fifth grating and a sixth grating, a third beam/port and a fourth beam/port, all of said second series of optical components optically aligned with one another;
   a pixellated, switchable grating, said pixellated, switchable grating having a plurality of pixels, each of said pixels having a controllable state, said controllable state having at least two state values, one of said at least two state values corresponding to substantially transmitting an incident beam; another one of said at least two state values corresponding to substantially diffracting said incident beam; said pixellated, switchable grating being interposed optically between said first optical system and said second optical system;
   said second grating being capable of redirecting said distinct input channels towards said pixellated, switchable grating and being capable of substantially redirecting at least a portion of said distinct input channels towards said third grating; said at least a portion of said distinct input channels being incident on at least one pixel from said plurality of pixels; said at least one pixel being in said one of said two state values;
   said third grating being capable of recombining said at least a portion of said distinct input channels for output into said second beam/port;
   at least another portion of said distinct input channels being capable of being diffracted; and
   means operably connected to said pixellated grating for controlling the state of each of said pixels;
   wherein a plurality of wavelength division multiplexed signals which pass through said first optical system and said second optical system can be individually exchangeable between said first optical system and said second optical system based upon the state of said pixels as said signals pass through said pixellated grating.

2. The optical add/drop multiplexing system as defined in claim 1, wherein said first grating, said second grating, said third grating, said fourth grating, said fifth grating and said sixth grating are each a non-switchable grating.

3. The optical add/drop multiplexing system as defined in claim 1, wherein at least one of said first grating, said second grating, said third grating, said fourth grating said fifth grating and said sixth grating is a non-switchable grating.

4. The optical add/drop multiplexing system as defined in claim 1, wherein at least one of said gratings is a volume holographic grating.

5. The optical add/drop multiplexing system as defined in claim 4, wherein said at least one of said volume holographic gratings is a Polymer Dispersed Liquid Crystal (PDLC) grating.

6. The optical add/drop multiplexing system as defined in claim 1, wherein said first grating, said third grating, said fifth grating and said sixth grating each have a preselected spatial frequency and said second grating, said fifth grating and said pixellated, switchable grating each have twice said preselected spatial frequency.

7. The optical add/drop multiplexing system as defined in claim 1, wherein said first grating and said third grating are optically positioned substantially symmetrically with respect to said second grating, and said fourth grating and said sixth grating are optically positioned substantially symmetrically with respect to said fifth grating.

8. An optical add/drop multiplexing system, comprising:
   a first pair of gratings optically aligned with one another, and a second pair of gratings optically aligned with one another, said first and second pair of gratings being optically aligned with each other and forming a first optical system; one grating from said first pair of gratings being capable of separating input optical radiation into distinct input channels;
   a third pair of gratings optically aligned with one another, said third pair of gratings forming a second optical system, said third pair of gratings including a switchable grating capable of being switched between states; said states comprising at least two states, one of said at least two states corresponding to substantially transmitting an incident beam; another one of said at least two state corresponding to substantially diffracting said incident beam;
   said switchable grating of said third pair of gratings being optically interposed between one of each of said first pair and said second pair of gratings of said first optical system; another grating from said first pair of gratings being capable of redirecting said distinct input channels towards said switchable grating; said switchable grating being capable being switched to said one of said at least two states and of substantially transmitting at least a portion of said distinct input channels from said first pair of gratings to said second pair of gratings; said switchable grating being capable being switched to said another one of said at least two states and of substantially diffracting at least another portion of said distinct input channels towards another grating from said third pair of gratings; and
   means operably connected to said switchable grating of said third pair of ratings for controlling the state of said switchable grating;
   wherein wavelength division multiplexed input signals can be exchangeable between said first optical system and said second optical system based upon the state of said switchable grating.

9. The optical add/drop multiplexing system as defined in claim 8, wherein said first optical system includes a first beam/port and a second beam/port, and said second optical system also includes a third beam/port.

10. The optical add/drop multiplexing system as defined in claim 9 further comprising:
- at least a fourth optical system, said at least a fourth optical system comprising a fourth pair of gratings, optically aligned with one another, said fourth pair of gratings including a switchable grating capable of being switched between states; and
- means operably connected to said switchable grating of said fourth pair of gratings for controlling the state of said switchable grating of said fourth pair of gratings.

11. An optical add/drop multiplexing system, comprising:
- a first optical system, said first optical system including a first series of optical components comprising a first grating, a second grating and a third grating, a first beam/port and a second beam/port. All of said first series of optical components optically aligned with one another; said first grating being capable of separating input optical radiation from said first beam/port into distinct input channels; and said second grating being a pixellated, switchable grating capable of being switched between states; said states comprising at least two states; one of said at least two states corresponding to substantially transmitting at least a portion of said distinct input channels; another one of said at least two states corresponding to substantially diffracting at least another portion of said distinct input channels; said second grating being capable of diffracting said at least another portion of said distinct input channels towards said third grating;
- a second optical system, said second optical system including a second series of optical components comprising a fourth grating, a fifth grating and a sixth grating, a third beam/port and a fourth beam/port, all of said second series of optical components optically aligned with one another said fourth grating being capable of separating input optical radiation from said third beam/port into distinct channels; and said fifth grating being a pixellated, switchable grating capable of being switched between states; said states comprising at least two fifth grating states; one of said at least two fifth grating states corresponding to substantially transmitting at least a portion of an incident beam; another one of said at least two fifth grating states corresponding to substantially diffracting at least another portion of said incident beam; said fifth grating being capable of diffracting said at least another portion of said distinct channels towards said sixth grating;
- a non-switchable grating, said non-switchable grating being interposed optically between said first optical system and said second optical system; said non-switchable grating being capable of receiving said at least a portion of said distinct input channels and of diffracting said at least a portion of said distinct input channels towards said fifth grating: and
- means operably connected to said pixellated gratings for controlling the state of each of said pixels;
- wherein a plurality of wavelength division multiplexed signals which pass through said first optical system and said second optical system can be individually exchangeable between said first optical system and said second optical system based upon the state of said pixels as said signals pass through said pixellated gratings.

12. The optical add/drop multiplexing system as defined in claim 11. wherein at least one of said gratings is a volume holographic grating.

13. The optical add/drop multiplexing system as defined in claim 12, wherein said at least one of said volume holographic gratings is a Polymer Dispersed Liquid Crystal (PDLC) grating.

14. The optical add/drop multiplexing system as defined in claim 11 further comprising a pixelated, switchable grating optically interposed between said second grating said third grating, said fourth grating and said fifth grating.

15. The optical add/drop multiplexing system as defined in claim 14 further comprising:
- a third optical system, said third optical system including a seventh grating, an eighth grating and a ninth grating, a first beam/port and a second beam/port, all of said first series of optical components optically aligned with one another, and said second grating being a pixellated, switchable grating.

* * * * *

UNITED STATES PATENT AND TRADEMARK OFFICE
CERTIFICATE OF CORRECTION

PATENT NO. : 7,277,640 B2
APPLICATION NO. : 10/717387
DATED : October 2, 2007
INVENTOR(S) : Thomas Stone It is certified that error appears in the above-identified patent and that said Letters Patent is hereby corrected as shown below:

Col. 12 Line 3 In Claim 3, after "fourth" delete "grating" and insert -- grating, --, therefor.

Col. 12 Line 14 In Claim 6, delete "fifth" and insert -- fourth --, therefor.

Col. 13 Line 15 In Claim 11, delete "beam/port." and insert -- beam/port, --, therefor.

Col. 13 Line 15 In Claim 11, delete "All" and insert -- all --, therefor.

Col. 14 Line 12 In Claim 11, delete "grating:" and insert -- grating; --, therefor.

Col. 14 Line 23 In Claim 12, delete "11." and insert -- 11, --, therefor.

Col. 14 Line 30 In Claim 14, delete "pixelated," and insert -- pixellated, --, therefor.

Col. 14 Line 31 In Claim 14, delete "grating" and insert -- grating, --, therefor.

Signed and Sealed this

Twenty-fourth Day of February, 2009

JOHN DOLL
*Acting Director of the United States Patent and Trademark Office*